(12) United States Patent
Natanzon

(10) Patent No.: US 12,450,365 B2
(45) Date of Patent: Oct. 21, 2025

(54) METHOD AND SYSTEM FOR DIFFERENTIAL DEDUPLICATION IN UNTRUSTED STORAGE

(71) Applicant: HUAWEI TECHNOLOGIES CO., LTD., Guangdong (CN)

(72) Inventor: Assaf Natanzon, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 258 days.

(21) Appl. No.: 18/309,354

(22) Filed: Apr. 28, 2023

(65) Prior Publication Data

US 2023/0267217 A1    Aug. 24, 2023

Related U.S. Application Data

(63) Continuation of application No. PCT/EP2020/080498, filed on Oct. 30, 2020.

(51) Int. Cl.
| | | |
|---|---|---|
| G06F 21/60 | (2013.01) | |
| G06F 3/06 | (2006.01) | |
| G06F 9/54 | (2006.01) | |
| G06F 21/62 | (2013.01) | |
| H04L 9/40 | (2022.01) | |

(52) U.S. Cl.
CPC .......... *G06F 21/602* (2013.01); *G06F 3/0608* (2013.01); *G06F 3/0641* (2013.01); *G06F 3/067* (2013.01); *G06F 9/544* (2013.01); *G06F 21/6218* (2013.01); *H04L 63/0428* (2013.01); *H04L 63/0442* (2013.01)

(58) Field of Classification Search
None
See application file for complete search history.

(56) References Cited

U.S. PATENT DOCUMENTS

| | | | | |
|---|---|---|---|---|
| 8,199,911 | B1 * | 6/2012 | Tsaur | G06F 21/6209 380/278 |
| 9,495,552 | B2 * | 11/2016 | El-Shimi | G06F 21/6218 |
| 10,496,626 | B2 * | 12/2019 | Friedman | G06F 3/0608 |
| 11,698,727 | B2 * | 7/2023 | Mehta | G06F 16/125 707/692 |
| 2013/0013880 | A1 * | 1/2013 | Tashiro | H03M 7/30 711/170 |
| 2013/0091102 | A1 * | 4/2013 | Nayak | G06F 3/067 707/E17.044 |

(Continued)

FOREIGN PATENT DOCUMENTS

| | | | | |
|---|---|---|---|---|
| EP | 3376393 A1 | 9/2018 | | |
| WO | WO-2018111133 A1 * | 6/2018 | | H03M 7/3091 |

OTHER PUBLICATIONS

International Search Report and Written Opinion in International Appln. No. PCT/EP2020/080498, mailed on Jul. 9, 2021, 10 pages (with English translation).

*Primary Examiner* — Lashonda Jacobs-Burton
(74) *Attorney, Agent, or Firm* — Fish & Richardson P.C.

(57) ABSTRACT

The present disclosure provides a method and system for differential deduplication of data blocks in an untrusted storage. An example system determines first data blocks of similar data blocks as reference data blocks and second data blocks of the identified similar data blocks which are compressed using the reference data blocks to enable differential deduplication of data blocks.

20 Claims, 7 Drawing Sheets

(56) References Cited

U.S. PATENT DOCUMENTS

| | | | |
|---|---|---|---|
| 2014/0189348 A1* | 7/2014 | El-Shimi | H04L 63/0428 |
| | | | 713/165 |
| 2015/0161000 A1* | 6/2015 | Kim | G06F 3/0608 |
| | | | 714/6.24 |
| 2017/0371581 A1* | 12/2017 | Rueger | G06F 16/1748 |
| 2018/0246666 A1* | 8/2018 | Katiyar | G06F 3/0608 |
| 2019/0294589 A1 | 9/2019 | Moiseev et al. | |
| 2022/0138159 A1* | 5/2022 | Natanzon | G06F 16/1744 |
| | | | 707/692 |
| 2023/0359381 A1* | 11/2023 | Colgrove | G06F 16/2255 |
| 2024/0037114 A1* | 2/2024 | Peignier | G06F 8/31 |

* cited by examiner

METHOD AND SYSTEM FOR DIFFERENTIAL DEDUPLICATION IN UNTRUSTED STORAGE

CROSS-REFERENCE TO RELATED APPLICATIONS

This application is a continuation of International Application No. PCT/EP2020/080498, filed on Oct. 30, 2020. The disclosure of the aforementioned application is hereby incorporated by reference in its entirety.

TECHNICAL FIELD

The present disclosure relates generally to the field of data protection and backup; and more specifically, to methods and systems for differential deduplication of one or more data blocks in untrusted storage.

BACKGROUND

Typically, data backup is used to protect and recover data in an event of data loss in a primary storage system (e.g. a server). Examples of the event of data loss may include, but is not limited to, data corruption, hardware or software failure in the primary storage system, accidental deletion of data, hacking, or malicious attack. Thus, for safety reasons, a separate backup system or a storage is extensively used to store a backup of the data present in the primary storage system. Typically, with time, storage space of the storage becomes occupied as changes in data or any new data occupy a large storage space in the conventional storages. This is undesirable as it causes reduction in performance of the storage systems. Moreover, the cost of data storage, with all the associated costs including cost of storage hardware, continues to be a burden.

Generally, in many cases like in a cloud environment, the storage may not be trusted (i.e. an untrusted storage). In such cases, data that is written to the untrusted storage is encrypted. In other words, in case of untrusted storage, there may be potential risk of data compromise, if data is stored without encryption. For example, any third party or untrusted entity may also be able to read the stored data in the untrusted storage (e.g. in cloud environment), and thus the data stored in such untrusted storage is encrypted to mitigate the compromise in data security. However, if the stored data is in encrypted form, this means that the data cannot be further compressed, and the use of encryption key becomes a bottleneck, which in turn limits the amount of data reduction in such conventional storage systems (e.g. the untrusted storage or the backup system). Moreover, in such conventional systems, there are issues with data deduplication as encrypted data can be de-duplicated only if the same encryption key is used.

Currently, there are many techniques that may be employed for data reduction, for example, fixed size data deduplication. In the fixed size data deduplication, a given storage is divided into fixed size aligned blocks for example of size 8 KB or 16 KB. Further, for each block a strong hash signature is calculated. If a block that is to be written to the storage has the same hash signature as an already-written block, the block is considered identical and thereby only a pointer (or a reference) to the block is used. If the block is not identical, the data of the block is compressed before writing to the storage. In this way, the data deduplication techniques overcome duplicating the same data in the storage. Further, currently, differential compression is employed for data reduction. Differential compression refers to identification of similarity between new blocks of data and blocks of data that are previously stored and further storing of only non-identical blocks of data in a compressed form. In an example, a similarity hash value is generated and stored for each of the new blocks of data. Thereafter, similarity hash value of the new blocks of data is compared with similarity hash value of blocks of data previously stored. Thus, the similar block is used as a reference for storing the new blocks in compressed form. However, conventional techniques do not allow any compression of deduplicated data unless there is trust between the storage and the servers writing to the storage. Thus, deduplication ratios and compression ratios are much lower on encrypted data in conventional technologies. Thus, it is still a technical problem of how to reduce data in a storage that is not trusted.

Therefore, in light of the foregoing discussion, there exists a need to overcome the aforementioned drawbacks associated with conventional data storage which do not allow any compression of deduplicated data without mutual trust between servers and storage.

SUMMARY

The present disclosure seeks to provide a method and system for differential deduplication of one or more data blocks in an untrusted storage. The present disclosure seeks to provide a solution to the existing problem of how to reduce data in a storage that is not trusted, where there is no compression of deduplicated data. An aim of the present disclosure is to provide a solution that overcomes at least partially the problems encountered in prior art, and provide improved methods and systems that provides an effective data storage with comparatively higher deduplication ratios and compression ratios at the untrusted storage by executing differential deduplication, as compared to conventional systems.

The object of the present disclosure is achieved by the solutions provided in the enclosed independent claims. Advantageous implementations of the present disclosure are further defined in the dependent claims.

In one aspect, the present disclosure provides a method for differential deduplication of one or more data blocks in an untrusted storage, the method comprises executing computer-readable instructions by implementing steps of: providing a hash value, one or more similarity hash values and a KeyIDs of an encryption key for data blocks; performing a first compression and a first encryption of the data blocks by a trusted server; sending the compressed and encrypted data blocks from the trusted server to the untrusted storage, by executing a write function of a first application programming interface, API; identifying by the untrusted storage similar data blocks of the stored compressed and encrypted data blocks with identical similarity hash values; performing a request by the trusted server for similar data blocks from the untrusted storage by executing a second application programming interface, API; returning from the untrusted storage to the trusted server a vector of similar data blocks by performing a read function of the second API; decrypting and decompressing the received compressed and encrypted similar data blocks by the trusted server; identifying similarities between the decompressed similar data blocks; determining first data blocks of the identified similar data blocks to be used as reference data blocks and the second data blocks of the identified similar data blocks to be compressed using the reference data blocks; performing a second compression by the trusted server to re-compress the second data blocks by using the reference data blocks and performing a second encryption for the re-encrypting the re-compressed data blocks; performing a write function, by executing the second API, to the untrusted storage, and sending the re-encrypted second data blocks compressed with the reference data blocks, hash values of the second data blocks, hash values of the reference data blocks, KeyIDs of the encryption keys of the second data blocks, KeyIDs of the encryption keys of the reference data blocks from the trusted server to the untrusted storage; replacing in the untrusted storage the data blocks of the first compression and first encryption with the data blocks of the second compression and the second encryption and obtaining differential deduplication data blocks.

The method of the present disclosure provides an improved data deduplication at the untrusted storage. The method identifies similar data blocks (that are already stored in the untrusted storage) to the data blocks that the trusted server provides to the untrusted storage for storing. The method enables storing of data blocks in compressed form by compressing the data blocks by using similar data blocks as reference. The data that is stored is differentially compressed and deduplicated even when the storage is untrusted in comparison to conventional methods where compression of deduplicated data is not possible in untrusted storages. Thus, the method of the present disclosure has improved deduplication ratios and compression ratios in comparison to conventional methods.

In an implementation form, the method further comprises defining one or more sets of trusted servers, wherein the one or more sets of trusted servers comprises one or more trusted servers.

The differential compression and deduplication of data is executed for every set of trusted servers of the one or more sets of trusted servers. Thus, the data blocks that are stored by a given trusted server of a given set of trusted servers are compressed with respect to similar data blocks already stored in the untrusted storage.

In a further implementation form, the method further comprises decompressing the differential deduplication data blocks by performing decryption of the differential deduplication data blocks, performing decryption of the compressed reference data blocks, performing decompression of the decrypted reference data blocks, performing decompression of the differential deduplication data blocks by using decompressed reference data blocks.

The differential deduplication data blocks are decompressed to receive data in original form, when needed, which was stored in a compressed form by taking similar data blocks as a reference data blocks.

In a further implementation form, sending comprises sending a size of the data blocks, the hash value, the similarity hash value and the KeyIDs of the encryption keys of the data blocks.

The size of data blocks, the hash value, the similarity hash value and the KeyIDs of the encryption keys enables the untrusted storage to efficiently store the data which enables efficient retrieval of data when needed. Further, similarity hash value is used to identify similar data blocks to executed differential compression.

In a further implementation form, returning the vector comprises returning the size of the compressed and encrypted data blocks, the KeyIDs of the encryption keys, the hash value, one or more similarity hash values of the compressed and encrypted data blocks. By virtue of the vector that is returned by the untrusted storage to the trusted server, the trusted server executed differential compression on the similar data blocks that are received by the trusted server.

In a further implementation form, the returning comprises returning the similar data blocks with largest common similarity hash values. By virtue of returning the similar data blocks with largest common similarity hash values enables efficient differential compression on the similar data blocks that are received by the trusted servers. Thus, less storage space is required for storing the data blocks in the untrusted storage.

In another aspect, the present disclosure provides a trusted server for differential deduplication of one or more data blocks in an untrusted storage, wherein the trusted server comprises a memory configured to store instructions and a server processor configured to execute the instructions to implement a first application programming interface for executing a write and a read function between the trusted server and the untrusted storage; implement a second application programming interface for executing a request and replacing function between the trusted server and the untrusted storage; calculate a hash value and one or more similarity hash values for one or more data blocks; perform in the untrusted storage differential deduplication of one or more data blocks; decrypt encrypted data blocks; and perform the data deduplication and compression to the untrusted storage.

The trusted server of the present disclosure provides an improved data storage at the untrusted storage. The trusted server identifies similarity between the similar data blocks that are received from the untrusted storage. The trusted server enables storing of data blocks in compressed form by compressing similar data blocks by using another similar data blocks as reference. The data that is stored is differentially compressed and deduplicated even when the storage is untrusted.

In an implementation form, the trusted server is configured to perform a first compression and a first encryption of the data blocks; send the compressed and encrypted data blocks to the untrusted storage; perform a request for similar data blocks from the untrusted storage; receive a vector of similar data blocks from the untrusted storage; decompress the received similar data blocks; determine first data blocks of the received similar data blocks to be used as reference data blocks and the second data blocks of the identified similar data blocks to be compressed using the reference data blocks; re-compress the second data blocks by using the reference data blocks and perform a second encryption for the re-encrypting the re-compressed data blocks; and send the re-encrypted second data blocks compressed with the reference data blocks, hash values of the second data blocks, hash values of the reference data blocks, KeyIDs of the encryption keys of the second data blocks and reference data blocks, KeyIDs of the encryption keys of the reference data blocks to the untrusted storage.

By virtue of the similar data blocks that are received by the trusted server, the trusted server compresses one similar data block by taking another similar data blocks as reference. Thus, differential compression is executed. Further, the trusted storage replaces the data block already stored in the untrusted storage with differentially compressed data block. Thus, storage space of untrusted storage is efficiently utilized.

In another aspect, the present disclosure provides a system for differential deduplication of one or more data blocks in an untrusted storage, the system comprises the untrusted storage configured to receive compressed and encrypted data blocks, to identify similar data blocks of the stored compressed and encrypted data blocks, to decrypt compressed reference data blocks; one or more sets of trusted servers, wherein the one or more sets of trusted servers comprise one or more trusted servers configured to calculate a hash value and one or more similarity hash values for one or more data blocks of one or more trusted servers; perform in the untrusted storage differential deduplication of one or more data blocks; decrypt encrypted data blocks, and perform the data deduplication and compression to the untrusted storage; a first application programming interface for executing a write and a read function between the trusted servers and the untrusted storage; and a second application programming interface for executing a request and replacing function between the trusted servers and the untrusted storage.

The system of the present disclosure provides an improved data storage at the untrusted storage. The system enables identification of similar data blocks (that are already stored in the untrusted storage) to the data blocks that trusted the server provides to the untrusted storage for storing. The system further enables storing of data blocks in compressed form by compressing the data blocks by using similar data blocks as reference. The data that is stored is differentially compressed and deduplicated even when the storage is untrusted in comparison to conventional systems where compression of deduplicated data is not possible in untrusted storages. Thus, the system of the present disclosure has improved deduplication ratios and compression ratios in comparison to conventional systems.

In an implementation form, the system further comprises a key manager running in a processor configured to generate to the one or more trusted servers one or more encryption keys. The key manager enables in providing unique encryption keys to a given set of trusted servers which enables in enhancing security of the encrypted data blocks that are stored in the untrusted storage.

In a further implementation form, the trusted servers are further configured to share the one or more encryption keys, the hash values and one or more similarity hash values between the trusted servers within the same sets of trusted servers.

The one or more encryption keys, the hash values and one or more similarity hash values are shared within the same set of trusted servers to prevent the trusted servers in the set of trusted servers to encrypt two or more data blocks with the same encryption keys. Thus, security of encrypted data blocks is enhanced when stored in untrusted storage.

In another aspect, the present disclosure provides a computer-readable media comprising computer-readable instructions for implementing a first application programming interface and a second application programming interface for differential deduplication of one or more data blocks in an untrusted storage according to the method of previous aspect. The computer-readable media of the present disclosure provides an improved data storage at the untrusted storage. The computer-readable media enables storing of data blocks in compressed form by compressing the data blocks by using similar data blocks as reference. The data that is stored is differentially compressed and deduplicated even when the storage is untrusted in comparison to conventional computer-readable media where compression of deduplicated data is not possible in untrusted storages. Thus, the computer-readable media of the present disclosure has improved deduplication ratios and compression ratios in comparison to conventional methods.

It is to be appreciated that all the aforementioned implementation forms can be combined. It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art understand that the drawings are not to scale. Wherever possible, like elements have been indicated by identical numbers.

Embodiments of the present disclosure are now described, by way of example only, with reference to the following diagrams wherein.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1A:
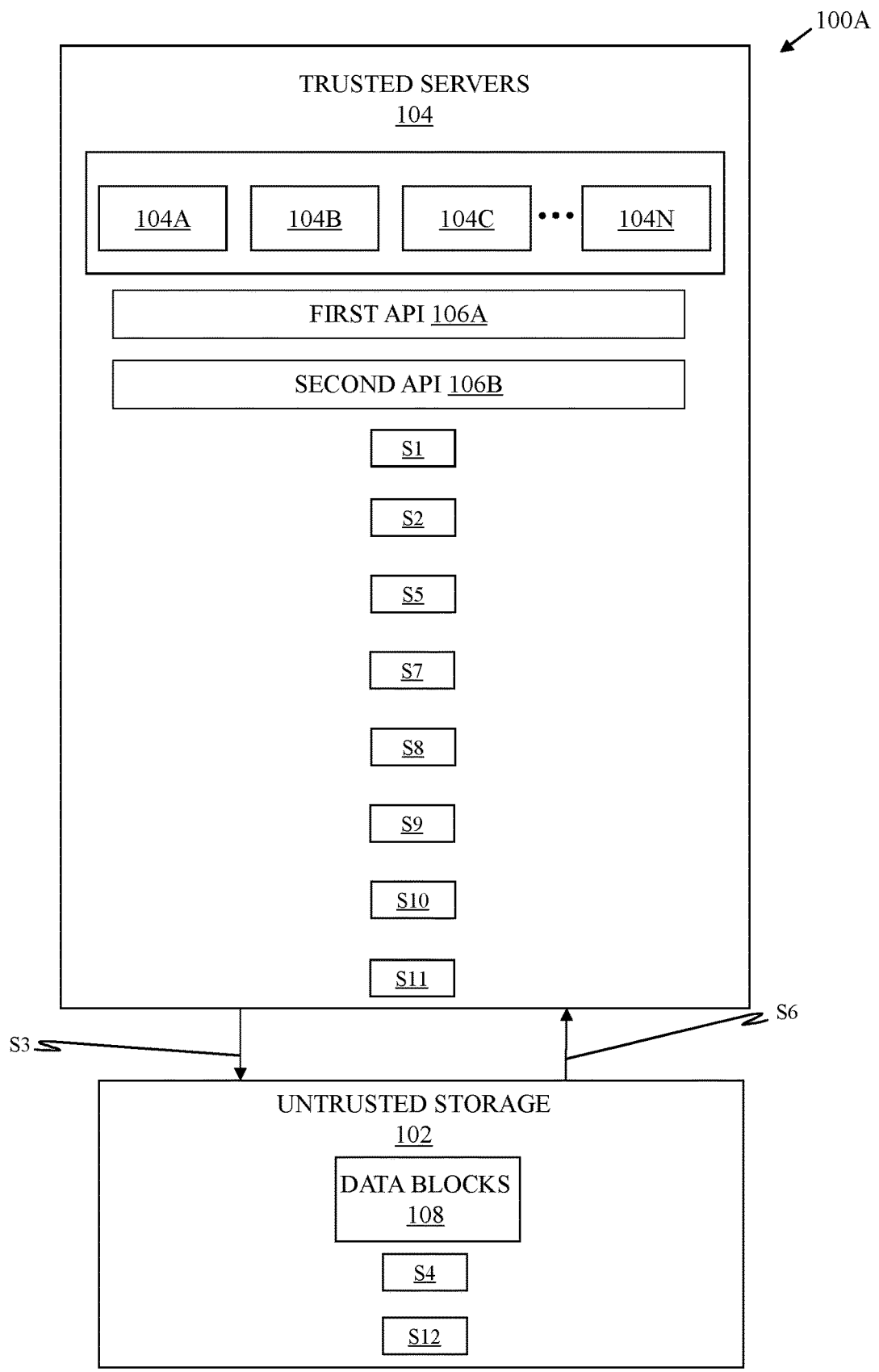
FIG. 1A is a flowchart of a method for differential deduplication of one or more data blocks in an untrusted storage, in accordance with an embodiment of the present disclosure.

FIG. 1A is a flowchart of a method for differential deduplication of one or more data blocks in an untrusted storage, in accordance with an embodiment of the present disclosure. In one aspect, the present disclosure provides a method 100A for differential deduplication of one or more data blocks in an untrusted storage, the method 100A comprises executing computer-readable instructions by implementing steps of: providing a hash value, one or more similarity hash values and a KeyIDs of an encryption key for data blocks; performing a first compression and a first encryption of the data blocks by a trusted server; sending the compressed and encrypted data blocks from the trusted server to the untrusted storage, by executing a write function of a first application programming interface, API; identifying by the untrusted storage similar data blocks of the stored compressed and encrypted data blocks with identical similarity hash values; performing a request by the trusted server for similar data blocks from the untrusted storage by executing a second application programming interface, API; returning from the untrusted storage to the trusted server a vector of similar data blocks by performing a read function of the second API; decrypting and decompressing the received compressed and encrypted similar data blocks by the trusted server; identifying similarities between the decompressed similar data blocks; determining first data blocks of the identified similar data blocks to be used as reference data blocks and the second data blocks of the identified similar data blocks to be compressed using the reference data blocks; performing a second compression by the trusted server to re-compress the second data blocks by using the reference data blocks and performing a second encryption for the re-encrypting the re-compressed data blocks; performing a write function, by executing the second API, to the untrusted storage, and sending the re-encrypted second data blocks compressed with the reference data blocks, hash values of the second data blocks, hash values of the reference data blocks, KeyIDs of the encryption keys of the second data blocks and reference data blocks, KeyIDs of the encryption keys of the reference data blocks from the trusted server to the untrusted storage; replacing in the untrusted storage the data blocks of the first compression and first encryption with the data blocks of the second compression and the second encryption and obtaining differential deduplication data blocks.

The method 100A includes steps S1-S12. With reference to FIG. 1A, there is further shown an untrusted storage 102 and sets of trusted servers 104 (which are described in detail, for example, in FIG. 1B). Each set of trusted servers 104 includes one or more trusted servers, such as the trusted servers 104A-104N wherein N may be any number of trusted servers. There is further shown, a first application programming interface (API) 106A and a second application programming interface (API) 106B. The untrusted storage 102 includes one or more data blocks 108.

At step S1, the method 100A comprises providing a hash value, one or more similarity hash values and a KeyIDs of an encryption key for data blocks. The hash value of the data blocks is calculated at a given trusted server of the trusted servers 104A-104N by using a hashing function. The hash value refers to fixed sized values of data having arbitrary sizes generated using hash functions or hashing algorithms. In other words, hash values refer to fixed sized values that represent original data having arbitrary sizes. In an example, hash value may be a hexadecimal string of several characters representing the data. Examples of the hashing function include but are not limited to SHA-1, SHA-2, MD5, CRC32. Beneficially, hash values enable comparison between two data blocks without actual comparing between the data of the two blocks of data. The hash value further enables identification and prevention of storage of duplicate data blocks by the trusted servers 104A-104N. The similarity hash values are calculated for the data blocks in a smart way, where identical similarity hashes indicate data is similar not identical, (i.e. there are some identical portions). The KeyID refers to an identification of the encryption key that is used to encrypt the data block. The KeyID enables the untrusted storage 102 to identify and provide correct encrypted data blocks requested by the one or more trusted servers 104A-104N when required. In an example, the untrusted storage 102 stores the KeyID of each data block 108 along with the data blocks 108 to enable efficient retrieval of the data blocks 108.

At step S2, the method 100A further comprises performing a first compression and a first encryption of the data blocks by a trusted server (e.g. the trusted server 104A). The data of each data block on the trusted server (e.g. the trusted server 104A) is compressed to reduce a storage space occupied by the data when stored in the untrusted storage 102. As a result, the untrusted storage 102 can store a larger amount of data in comparison to storing uncompressed data. In an example, the sets of trusted servers 104 uses a compression algorithm for compressing the data. Examples of compression algorithms include, but are not limited to LZ77, DEFLATE, LZR, Convolutional Neural Network (CNN) based compression, Generative Adversarial Network (GAN) based compression. According to an embodiment, each data block is compressed to a level that during decompression of the data, the authenticity of the data is maintained. The compressed data is encrypted using an encryption algorithm. The compressed data is encrypted to prevent undesired access of the compressed data by any unauthorized users, servers, or third party entities (e.g. in a cloud environment). For example, the data may contain confidential information associated with for example the trusted server (e.g. the trusted server 104A). The encryption of the compressed data prevents information theft of such confidential information by unauthorised users. The encryption key is a unique encryption key that is used specifically for a respective data block. The same encryption key can be used for different blocks. The encryption key can be changed periodically. All trusted servers have access to all encryption keys. As a result, the data may be accessed only using the encryption key. Examples of encryption algorithms include but are not limited to Twofish, MD5, Advanced Encryption Standard (AES), international Data Encryption Algorithm (IDEA) and the like.

At step S3, the method 100A further comprises sending the compressed and encrypted data blocks from the trusted server (e.g. trusted server 104A) to the untrusted storage 102, by executing a write function of a first application programming interface 106A. The untrusted storage 102 stores the compressed and encrypted data blocks from each of the sets of trusted servers 104. Moreover, the hash value, the one or more similarity hash values and the KeyIDs for data blocks is stored along with the compressed and encrypted data blocks. In an example, the trusted server (e.g. trusted server 104A) sends the compressed and encrypted data blocks to the untrusted storage 102 via a communication network shown in FIG. 1B. In an example, the untrusted storage 102 stores the similarity hashes in a data structure that allow efficient searching of similar blocks.

In an example, a write function is represented by function (1) that is shown below:

write(offset, size, vector(compressed_data, compressed_size, hash of data before compression, set<similarity hash values before compression>, keyID of encryption))     (1)

wherein,

'offset' refers to offset in the untrusted storage 102. The offset may be a multiple of the size of the compressed data block. For example, if a trusted server (e.g. the server 104A) compresses data in chunks of 8 Kilobytes, the write will be to offset which is a multiple of 8 Kilobytes. In another example, the trusted server may compress data in chunks of 16 kb or 32 kb or another number and thereby the write will be to offset which is a multiple of 16 kb or 32 kb or another number respectively;

'size' refers to a number of blocks to be written (without compression). The number of block is also multiple of the compressed block size for example a multiple of 8 Kilobytes;

'vector(compressed_data, compressed_size, hash of data before compression, keyID of encryption))' refers to the vector with compressed data elements, the size of the vector is the number of compressed data elements. For example, if the compressed block is 8 Kilobytes and the size is 64 Kilobytes, the number of elements in the vector is 8 (i.e. 64/8=8);

'compressed_data' refers to the data of a single compressed block;

'compressed_size' refers to the size in bytes of the compressed data;

'hash of data before compression' refers to a hash for example SHA2 of the data before the compression and encryption were applied (the hash value may also be encrypted with the same key as the compressed data);

'set<similarity hash values before compression>' refers to a set of similarity hashes for the data before the compression such as min hash which allows the untrusted storage 102 to find similar data blocks without being able to know the content of the data block;

'keyID of encryption' refers to an identification of the encryption key that was used to encrypt the data after the data was compressed.

In an example, a read function is represented by function (2) given below:

vector(compressed_data, compressed size, hash of data before compression, set<compressed—reference block>, keyID of encryption)=Read (offset, size)     (2)

wherein parameters are the same as for the write function (1) except the vector now is the output and not the input, and a set of compressed reference blocks are received in case the block was compressed using a reference block. In other words, the parameters are not exactly identical, the meaning of them is the same, for example the set of reference block is also received in function (2), but compressed data for example is the same in function (1) and (2).

At step S4, the method 100A further comprises identifying by the untrusted storage 102 similar data blocks of the stored compressed and encrypted data blocks with identical similarity hash values. During the execution of the write function, the hash value, the similarity hash value and the KeyID received from the trusted server (e.g. server 104A) is compared with the hash values and KeyIDS already stored in the untrusted storage 102. If the untrusted storage 102 finds that the compressed and encrypted data blocks with the same hash already exists for a given set of servers, the untrusted storage 102 may check if the KeyID of the encryption changed, if the key did not change, the untrusted storage 102 just stores a pointer from a new offset to a location of the data block. If the key changed, the untrusted storage 102 also changes the data and the KeyID and stores the new data block (i.e. compressed and encrypted data block) instead of the last (previous) data block. As a result, deduplication of data is executed by the method 100A of the present disclosure such that same (or similar) data is not stored again in the untrusted storage 102.

At step S5, the method 100A further comprises performing a request by the trusted server (e.g. the trusted server 104A) for similar data blocks from the untrusted storage 102 by executing a second application programming interface 106B. The similar data blocks of the stored compressed and encrypted data blocks that are identified by the trusted server (e.g. the trusted server 104A) based on the similarity hash values may be requested by the trusted server (e.g. the trusted server 104A) by execution of the second application programming interface 106B. The trusted server (e.g. the trusted server 104A) executes differential deduplication using the similar data blocks that are received from the untrusted storage 102.

At step S6, the method 100A further comprises returning from the untrusted storage 102 to the trusted server (e.g. the trusted server 104A) a vector of similar data blocks by performing a read function of the second API 106B. Based on the request from the trusted server (e.g. the trusted server 104A), the untrusted storage 102 returns a list of similar blocks based on the similarity hashes entered in the write function (1). In an example, the untrusted storage 102 returns data blocks which are not already compressed in a differential way.

In an example, a function (3) represented below enables the trusted server (e.g. the trusted server 104A) to fetch similar data blocks and further execute differential deduplication on the similar data blocks.

SimlarBlocks=FetchSimilarBlocksForBackgorundCompression (MaxElementnum)     (3)

where SimilarBlocks is vector<compressedData, comprpessedDataSize, HashBeforeCompression, KeyID) which is similar to that in write function (1);

'MaxElementnun' refers to the maximum number of similar blocks the untrusted storage 102 returns to the trusted server (e.g. trusted server 104A).

At step S7, the method 100A further comprises decrypting and decompressing the received compressed and encrypted similar data blocks by the trusted server (e.g. the trusted server 104A). The data blocks are stored in the untrusted storage 102 in compressed and encrypted form. Thus, the received compressed and encrypted similar data blocks when received by the trusted server (e.g. the trusted server 104A) is decrypted and decompressed to obtain the data block in its original form i.e. before compression, to further enable the trusted server (e.g. the trusted server 104A) to execute differential compression. In an example, if the compressed and encrypted similar data blocks was previously compressed with reference to another data block then that data block is also received and decompressed first to enable decompression of the compressed and encrypted similar data blocks.

In an example, the compressed and encrypted similar data blocks are first decrypted and then decompressed. As the data blocks that are stored in untrusted storage 102 are compressed and encrypted using the encryption key, the decryption of the data during execution of the read function requires matching the key ID of the encryption key to enable decryption of data using the encryption key. As a result, any unauthorized server cannot access the data without having the correct first encryption key. Beneficially, this makes the method 100A secure from data theft while also ensuring storage of data is in compressed form without the need of any mutual trust between the first set of servers and the untrusted storage 102. The method 100A of the present disclosure provides a new protocol that allows doing the compression of data on the first set of trusted servers, while allowing the untrusted storage 102 to have de-duplication and storing of the data in a compressed form, thus allowing data reduction even when storage is not trusted.

In an example, when received compressed and encrypted similar data blocks is read by the trusted server (e.g. the trusted server 104A), the trusted server decrypts each block with the key matching the KeyID, then the trusted server decompresses the data, and verifies that the decompressed data indeed has the correct hash value, this allows integrity of the data. If the compressed and encrypted similar data block was compressed using differential deduplication, the untrusted storage 102 also returns a set of compressed and encrypted reference blocks, the trusted server (e.g. the trusted server 104A) decrypts the reference blocks using the matching encryption key (each reference block may have a different encryption key), and then decompress original block (i.e. compressed and encrypted similar data block) using the reference blocks.

At step S8, the method 100A further comprises identifying similarities between the decompressed similar data blocks. The trusted server (e.g. the trusted server 104A) decompresses all the received compressed and encrypted similar data blocks and finds if there is similarity between the decompressed similar data blocks. In an example, the hash value and the similarity hash value may be used for identifying the similarities between the decompressed similar data blocks. In an example, similarities are identified between the data blocks that are stored in the untrusted storage 102 at step S3 and the similar data blocks received from the untrusted storage 102. In an example, the data blocks that are stored in the untrusted storage 102 at step S3 may be included in the similar data blocks that are received from the untrusted storage 102. The similarity is determined at the untrusted storage 102 by the similarity hash, the untrusted storage 102 receives the function (3) i.e. FetchSimilarBlocksForBackgorundCompression and then compresses using differential compression.

At step S9, the method 100A further comprises determining first data blocks of the identified similar data blocks to be used as reference data blocks and the second data blocks of the identified similar data blocks to be compressed using the reference data blocks. In other words, the trusted server (e.g. the trusted server 104A) decides which blocks may be used as reference blocks and which blocks may be compressed using the similar blocks based on the similarities that are identified. In an example, the reference block that give better compression is used, the blocks are the same size, but differential compression will be different based on the reference block. In an example, the data blocks that are stored in the untrusted storage 102 at step S3 may be identified as first data blocks and the similar data blocks received from untrusted storage 102 may be identified as second data blocks.

At step S10, the method 100A further comprises performing a second compression by the trusted server (e.g. the trusted server 104A) to re-compress the second data blocks by using the reference data blocks and performing a second encryption for the re-encrypting the re-compressed data blocks. In other words, differential compression is executed in the method 100A of the present disclosure. As a result, there is an improved amount of storage space that is saved in comparison to normal compression which further enhances performance of the untrusted storage 102. The second compression may be performed by compression algorithms known in the art.

At step S11, the method 100A further comprises performing a write function, by executing the second API 106B, to the untrusted storage 102, and sending the re-encrypted second data blocks compressed with the reference data blocks, hash values of the second data blocks, hash values of the reference data blocks, KeyIDs of the encryption keys of the second data blocks, KeyIDs of the encryption keys of the reference data blocks from the trusted server (e.g. the trusted server 104A) to the untrusted storage 102. The trusted server (e.g. the trusted server 104A) writes the compressed data of the block (i.e. re-encrypted second data block) which was compressed in differential deduplication along with the list of hashes of blocks that were used as reference for this block. Hash values of the second data blocks and reference data blocks enable the untrusted storage 102 to prevent storage of duplicate data blocks are a given set of trusted servers.

In an example, the write function of the second API 106B is represented by function (4) given below.

WriteDifferentialBlock(compressedData,
   HashOfDataBeforeCompression, keyID,
   vector<hash of reference before compression>)     (4)

wherein 'vector<hash of reference before compression>' refers to the vector representing hash values of the reference data blocks;

'compressed_data' refers to the data of a re-encrypted second data block;

'compressed_size' refers to the size in bytes of the compressed data of the re-encrypted second data block;

'hash of data before compression' refers to a hash for example SHA2 of the data of the re-encrypted second data block before the compression and re-encryption were applied;

'keyID of encryption' refers to an identification of the encryption key that was used to re-encrypt the data of the re-encrypted second data block after the data was compressed.

At step S12, the method 100A further comprises replacing in the untrusted storage 102 the data blocks of the first compression and first encryption with the data blocks of the second compression and the second encryption and obtaining differential deduplication data blocks. Beneficially, an improved storage space of the untrusted storage 102 is saved by replacing data blocks of first compression with data blocks of second compression. Thus the method 100A provides a new protocol that enables to execute compression and differential deduplication by the trusted server (e.g. the trusted server 104A), while enabling the untrusted storage 102 to have deduplication and store the data in compressed form i.e. differential compression.

According to an embodiment, the method 100A further comprises defining one or more sets of trusted servers 104, wherein the one or more sets of trusted servers 104 comprises one or more trusted servers 104A-104N. Generally, each set of trusted servers 104 are the servers that are trusted for data safety. Specifically, each set of trusted servers 104 are servers that can communicate with each other to share the same encryption keys or have a key manager for sharing the same keys for encryption. The sets of trusted servers 104 is defined so that deduplication can be executed exclusively for a given set of trusted servers, so the data of one set of trusted servers is not overwritten by another set of trusted servers during backup. Moreover, one set of trusted servers 104 may share the same encryption keys and a same hash function. In an example, a set of trusted servers includes a set of host servers of a given organization, a team or department within an organisation, or any entity. In another example, a set of trusted servers includes servers of different participating entities which trust each other with data that is shared and stored in the untrusted storage 102. A given set of trusted servers may be defined by one of the trusted servers 104, which may act as a management server or based on a user input, for example, user-configurations or settings. Each trusted server in the set of trusted servers is configured to use the encryption key for encrypting the data using an encryption algorithm and use the hash function for hashing the data.

The method further comprising storing data blocks provided by each trusted server of the sets of trusted servers 104 in the untrusted storage 102. Moreover, the data blocks are stored in an encrypted form using encryption keys and thus are referred to as encrypted data blocks 108. The data blocks are compressed before being encrypted. Further, a hash value of the data blocks before compression and encryption is also calculated and stored in the untrusted storage 102 along with the data blocks 108. Further, a KeyID of the encryption key is also stored in the untrusted storage 102.

According to an embodiment, the method 100A further comprises decompressing the differential deduplication data blocks by performing decryption of the differential deduplication data blocks, performing decryption of the compressed reference data blocks, performing decompression of the decrypted reference data blocks, performing decompression of the differential deduplication data blocks by using decompressed reference data blocks. The differential deduplication data blocks are decompressed when the data blocks are needed in an original form. In an example, at step S9 the trusted server (e.g. the trusted server 104A) decides to compress a second data block using a first data block as a reference. The trusted server (e.g. the trusted server 104A), writes the second data block compressed when first data block used as reference, and writes the hash of the second data block and the reference of the first data block, the KeyID of the encryption is the current encryption key. The untrusted storage 102 replaces, at step S12, the original compressed second data block, with the differentially deduplicated block. Further, when the second data block is to be read, the differential deduplication second data block is received, with its hash and key ID, but we also get compressed first data block with its hash and key ID, in order to decompress second data block. Thus, first and second data blocks are decrypted, first data block is decompressed and second data block is compressed using first data block as a reference.

According to an embodiment, sending comprises sending a size of the data blocks, the hash value, the similarity hash value and the KeyIDs of the encryption keys of the data blocks. The size of the data blocks is the number of blocks to be written to the untrusted storage 102 by the trusted server (e.g. the trusted server 104A). The hash value of data blocks is calculated before the compression and encryption are executed on the data block. The similarity hash value of data blocks is calculated before the compression and encryption are executed on the data block to enable untrusted storage 102 to find similar data blocks. The KeyID of encryption keys of the data blocks is used as an identification of the encryption key that was used to encrypt the data blocks.

In an example, when the set of trusted servers 104 writes to the untrusted storage 102, if the writes are not aligned to the block, a read before write is performed so that there would be data for writing. The set of trusted servers 104 when trying to write the data in untrusted storage 102, separate the data into fixed sized aligned blocks according to the storage block size for compression, each block will be compressed and then encrypted, the hash of the data will be calculated before the compression, and also the similarity hashes will be calculated before the compression, and the server will then write the data including the key id of the encryption and the hash.

The untrusted storage 102 is a block-based storage. In an example, a basic block size is 8 Kilobytes, that means all inputs and outputs of the data to the untrusted storage 102 must be aligned to 8 Kilobytes offset and of size which is a multiple of 8 Kilobytes (i.e. 24 Kilobytes, 40 Kilobytes, 128 Kilobytes and the like). Size of write (before compression) must be multiple of 8 Kilobytes (i.e. according to the storage block size) for example writing 8 Kilobytes, 16 Kilobytes, 24 Kilobytes, 64 Kilobytes, but not writing 4 Kilobytes. In an example, if 4 Kilobytes of data is to be written to offset 22 Kilobytes, then there is a need to first read from offset 16 Kilobytes, an amount of 16 Kilobytes, replace the 4 Kilobytes from offset 18 Kilobytes till 22 Kilobytes with the new data, and then write again the 16 Kilobytes to offset 16 Kilobytes.

According to an embodiment, returning the vector comprises returning the size of the compressed and encrypted data blocks, the KeyIDs of the encryption keys, the hash value, one or more similarity hash values of the compressed and encrypted data blocks. The size of compressed and encrypted data blocks refers to a number of compressed and encrypted data blocks. KeyID is the identification of the encryption key used for encryption of the compressed and encrypted data blocks. The hash value is the hash value of the compressed and encrypted data blocks before compression and encryption. The similarity hash value is the hash value of the compressed and encrypted data blocks before compression and encryption.

According to an embodiment, the returning comprises returning the similar data blocks with largest common similarity hash values. If data blocks have same similarity hash values, usually there may be more than one common similarity hash for each data block, and the untrusted storage 102 may return data blocks with largest common similarity hash values.

The steps S1 to S12 are only illustrative and other alternatives can also be provided where one or more steps are added, one or more steps are removed, or one or more steps are provided in a different sequence without departing from the scope of the claims herein.

In another aspect provided is a computer-readable media comprising computer-readable instructions for implementing a first application programming interface 106A and a second application programming interface 106B for differential deduplication of one or more data blocks 108 in an untrusted storage 102 according to the method 100A. The computer readable media comprising computer-readable instructions may include, but is not limited to, an electronic storage device, a magnetic storage device, an optical storage device, an electromagnetic storage device, a semiconductor storage device, or any combination of the foregoing. In yet another aspect, the present disclosure provides a computer program adapted to perform the method 100A by a device (e.g. one of the trusted servers 104 or the untrusted storage 102). In another aspect, the present disclosure provides a computer program product comprising a non-transitory computer-readable storage medium having computer-readable instructions being executable by a processor to execute the method 100A. Examples of implementation of the non-transitory computer-readable storage medium include, but is not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, or CPU cache memory.

Figure 1B:
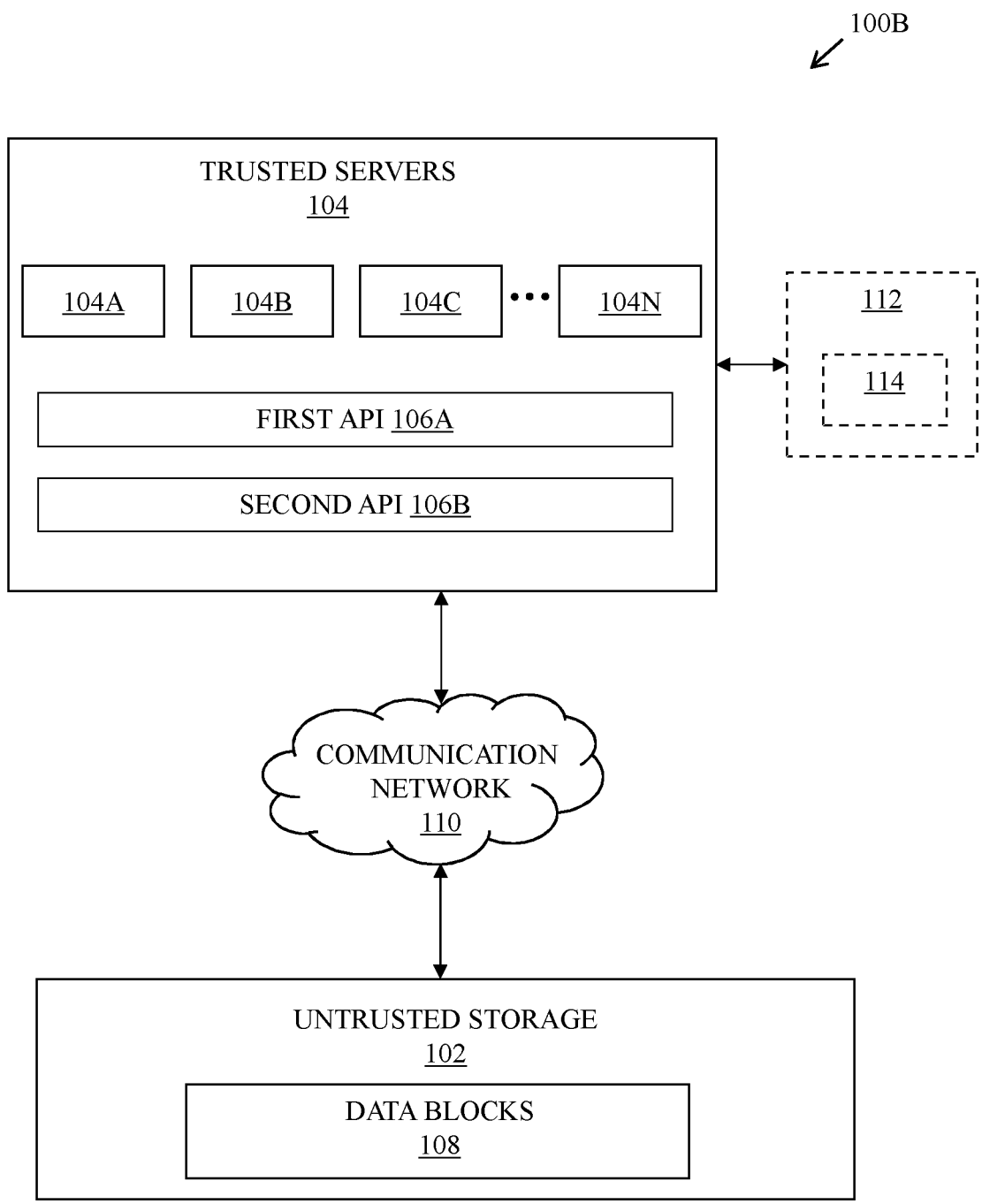
FIG. 1B is a network environment diagram of a system for differential deduplication of one or more data blocks in an untrusted storage, in accordance with an embodiment of the present disclosure.

FIG. 1B is a network environment diagram of a system for differential deduplication of one or more data blocks in an untrusted storage, in accordance with an embodiment of the present disclosure. With reference to FIG. 1B, there is shown a system 100B. The system 100B includes the untrusted storage 102 and the sets of trusted servers 104. The sets of trusted servers 104 may be communicatively coupled to the untrusted storage 102 via the communication network 110. The sets of trusted servers 104 include one or more trusted servers 104A-104N. The sets of trusted servers 104 further includes the first application programming interface (API) 106A and the second application programming interface (API) 106B. The untrusted storage 102 includes data blocks 108.

In another aspect, the present disclosure provides a system 100B for differential deduplication of one or more data blocks 108 in an untrusted storage 102, the system 100B comprises the untrusted storage 102 configured to receive compressed and encrypted data blocks, to identify similar data blocks of the stored compressed and encrypted data blocks, to decrypt compressed reference data blocks; one or more sets of trusted servers 104, wherein the one or more sets of trusted servers 104 comprise one or more trusted servers 104A-104N configured to calculate a hash value and one or more similarity hash values for one or more data blocks 108 of one or more trusted servers 104A-104N; perform in the untrusted storage 102 differential deduplication of one or more data blocks 108; decrypt encrypted data blocks, and perform the data deduplication and compression to the untrusted storage 102; a first application programming interface 106A for executing a write and a read function between the trusted servers 104A-104N and the untrusted storage 102; and a second application programming interface 106B for executing a request and replacing function between the trusted servers 104A-104N and the untrusted storage 102.

The untrusted storage 102 includes suitable logic, circuitry, interfaces, or code that is configured to store data (e.g. data associated with various software applications executed on the sets of trusted servers 104) as data blocks 108 having fixed aligned sizes. In other words, untrusted storage 102 is a backup storage in which the sets of trusted servers 104 can store data in the form of data blocks for any defined duration. In an example, the untrusted storage 102 is a block device or an electronic device that employs a block device for data storage. In an example, the untrusted storage 102 is non-volatile mass storage device, such as a cloud-based storage media.

Each server of the one or more trusted servers 104A-104N includes suitable logic, circuitry, interfaces, or code that is configured to store, process or transmit information to the untrusted storage 102 via the communication network 110. Examples of the servers include, but are not limited to a storage server, a cloud server, a web server, an application server, or a combination thereof. According to an embodiment, the server includes any arrangement of physical or virtual computational entities capable of enhancing information to perform various computational tasks. In an example, the servers may be a single hardware server. In another example, the servers may be a plurality of hardware servers operating in a parallel or distributed architecture. In an example, the server may include components such as memory, a processor, a network adapter and the like, to store, process or share information with other computing components, such as a user device. In an example, the server is implemented as a computer program that provides various services (such as database service) to other devices, modules or apparatus.

The first application program interface 106A and the second application program interface 106B refer to a set of functions that can be called from an application program to access features of another program for executing functions such as read or write functions between the untrusted storage 102 and the sets of trusted servers 104. In an implementation, the application program interfaces 106A, 106B is implemented in each of the trusted servers 104. In another implementation, the first application program interface 106A and the second application program interface 106B may be implemented in the sets of trusted servers 104. In an example, the first application program interface 106A and the second application program interface 106B is a software interface that includes one or more routines, data structures, object classes, and protocols that support the interaction of the one or more trusted servers 104A-104N and untrusted storage 102.

The communication network 110 includes a medium (e.g. a communication channel) through which the sets of trusted servers 104 communicate with the untrusted storage 102. The communication network 110 may be a wired or wireless communication network. Examples of the communication network 110 may include, but are not limited to, a Wireless Fidelity (Wi-Fi) network, a Local Area Network (LAN), a wireless personal area network (WPAN), a Wireless Local Area Network (WLAN), a wireless wide area network (WWAN), a cloud network, a Long Term Evolution (LTE) network, a Metropolitan Area Network (MAN), or the Internet. The untrusted storage 102 and the sets of trusted servers 104 may be configured to connect to the communication network 110, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), or other cellular communication protocols or Bluetooth (BT) communication protocols, including variants thereof.

The system 100B comprises the untrusted storage 102 configured to receive compressed and encrypted data blocks, to identify similar data blocks of the stored compressed and encrypted data blocks, to decrypt compressed reference data blocks. The data is stored in the form of compressed and encrypted data blocks of fixed aligned sizes in the untrusted storage 102. The fixed size herein refers to the amount of data (for example in chunks of defined size) that a block can store. The sets of trusted servers 104 write data to the untrusted storage 102, by separating (i.e. creating chunks of) the data into fixed aligned sized blocks according to sizes of the encrypted data blocks in the untrusted storage 102. The data is separated at a given trusted server (e.g. the trusted server 104A) into blocks having fixed aligned size to enable improved storing and efficient retrieval of data from the untrusted storage 102. The similar data blocks are identified to enable differential compression on the data blocks that are stored in the untrusted storage 102 to save storage space. The compressed reference data blocks are decrypted to enable decompressing of the differential deduplication data blocks when needed.

The system 100B further comprises one or more sets of trusted servers 104, wherein the one or more sets of trusted servers 104 comprise one or more trusted servers 104A-104N configured to calculate a hash value and one or more similarity hash values for one or more data blocks 108 of one or more trusted servers 104A-104N; perform in the untrusted storage 102 differential deduplication of one or more data blocks 108; decrypt encrypted data blocks, and perform the data deduplication and compression to the untrusted storage 102. The one or more trusted servers 104A-104N is configured to store the hash value and similarity hash value of data blocks along with the data blocks in the untrusted storage 102. Further, the one or more trusted servers 104A-104N receive the similar data blocks to execute differential compression and deduplication.

The system 100B further comprises the first application programming interface 106A for executing a write and a read function between the trusted servers 104A-104N and the untrusted storage 102. The trusted servers 104A-104N write the compressed and encrypted data blocks to the untrusted storage 102 and read the compressed and encrypted data blocks from the untrusted storage 102 using the first application programming interface 106A.

The system 100B further comprises the second application programming interface 106B for executing a request and replacing function between the trusted servers 104A-104N and the untrusted storage 102. The trusted servers 104A-104N requests for similar data blocks from the untrusted storage 102 and replaces the data blocks with first compression with data blocks with second compression using the second application programming interface 106B.

According to an embodiment, the system 100B further comprises a key manager 112 running in a processor 114 configured to generate to the one or more trusted servers 104A-104N one or more encryption keys. In an example, the key manager 112 may include an indexed form of the encryption keys used by the respective set of the different sets of trusted servers 104. Moreover, the key manager 112 may include a key generation algorithm to generate the encryption keys for use by the trusted servers 104A-104N. According to an embodiment, each trusted server 104A-104N can communicate to other trusted servers to share the encryption keys. If the same encryption keys are used, and the same hash function is used then there is no need for communication between the trusted servers as there is a key manger, and a defined protocol may be used.

According to an embodiment, the trusted servers 104A-104N are further configured to share the one or more encryption keys, the hash values and one or more similarity hash values between the trusted servers within the same sets of trusted servers. The system 100B enables differential compression and deduplication among a given set of trusted servers thus, hash values and encryption keys are not the same for the given set of trusted servers.

Figure 2A:
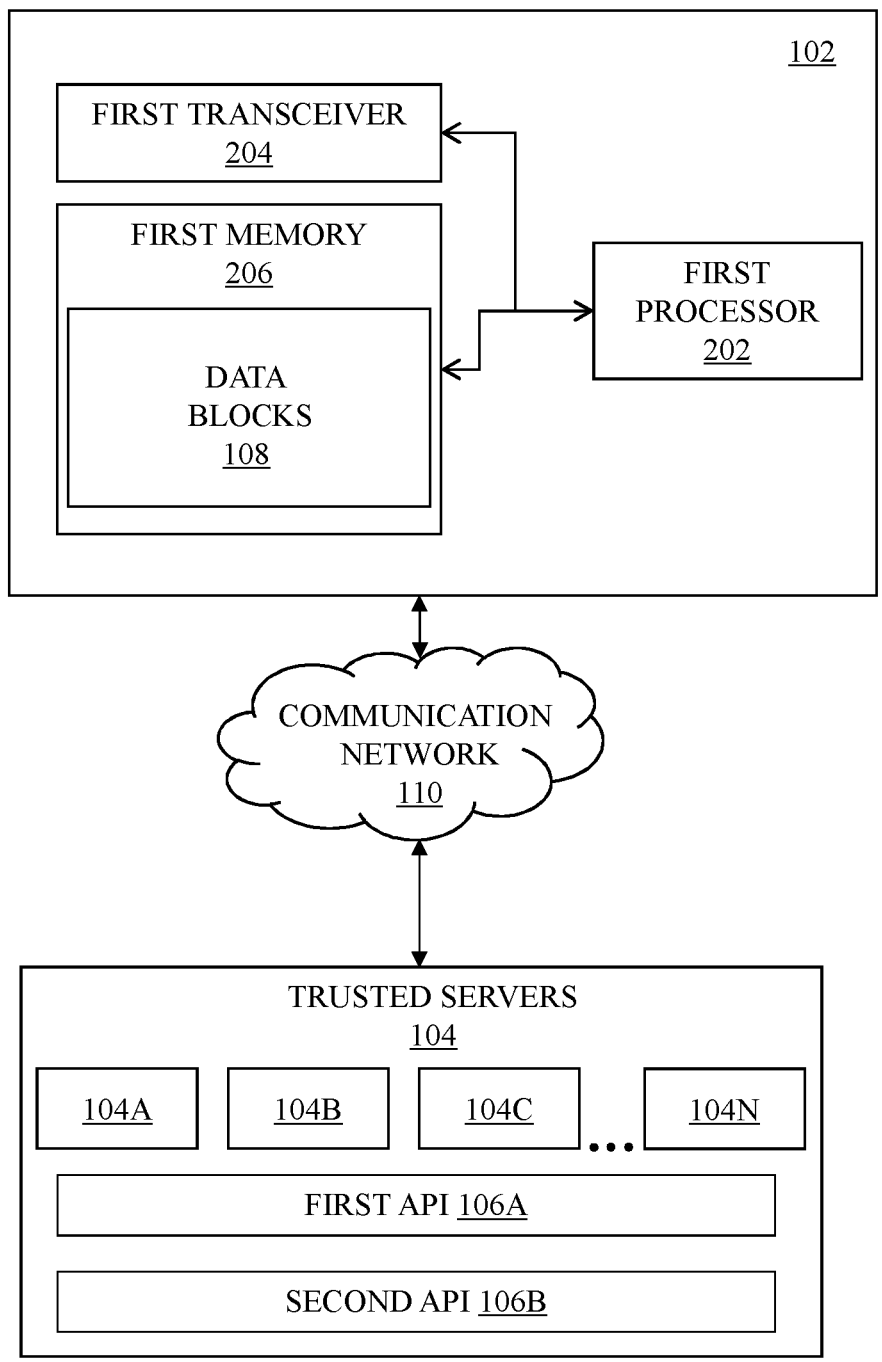
FIG. 2A is a block diagram that illustrates various exemplary components of an untrusted storage, in accordance with an embodiment of the present disclosure.

FIG. 2A is a block diagram that illustrates various exemplary components of an untrusted storage, in accordance with an embodiment of the present disclosure. With reference to FIG. 2A, there is shown the untrusted storage 102. The untrusted storage 102 includes a first processor 202, a first transceiver 204, and a first memory 206. The first processor 202 may be communicatively coupled to the first transceiver 204 and the first memory 206. The untrusted storage 102 is coupled to the sets of trusted servers 104 via the communication network 110.

The first processor 202 is configured to receive the data from the sets of trusted servers 104. In an implementation, the first processor 202 is configured to execute instructions stored in the first memory 206. In an example, the first processor 202 may be a general-purpose processor. Other examples of the first processor 202 may include, but is not limited to a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or control circuitry. Moreover, the first processor 202 may refer to one or more individual processors, processing devices, a processing unit that is part of a machine, such as the untrusted storage 102.

The first transceiver 204 includes suitable logic, circuitry, and interfaces that may be configured to communicate with one or more external devices, such as the sets of trusted servers 104. Examples of the first transceiver 204 may include, but is not limited to, an antenna, a radio frequency (RF) transceiver, one or more amplifiers, one or more oscillators, a digital signal processor, a coder-decoder (CODEC) chipset, or a subscriber identity module (SIM) card.

The first memory 206 refers to a primary storage of the untrusted storage 102. The first memory 206 includes suitable logic, circuitry, and interfaces that may be configured to store the data blocks 108 and the instructions executable by the first processor 202. Examples of implementation of the first memory 206 may include, but are not limited to, Electrically Erasable Programmable Read-Only Memory (EEPROM), Random Access Memory (RAM), Read Only Memory (ROM), Hard Disk Drive (HDD), Flash memory, Solid-State Drive (SSD), or CPU cache memory. The first memory 206 may store an operating system or other program products (including one or more operation algorithms) to operate the untrusted storage 102.

In operation, the first processor 202 of the untrusted storage 102 is configured to receive compressed and encrypted data blocks from the trusted server (e.g. trusted server 104A). The first processor 202 is further configured to identify similar data blocks of the stored compressed and encrypted data blocks based on the compressed and encrypted data blocks. The first processor 202 is further configured to decrypt compressed reference data blocks.

Figure 2B:
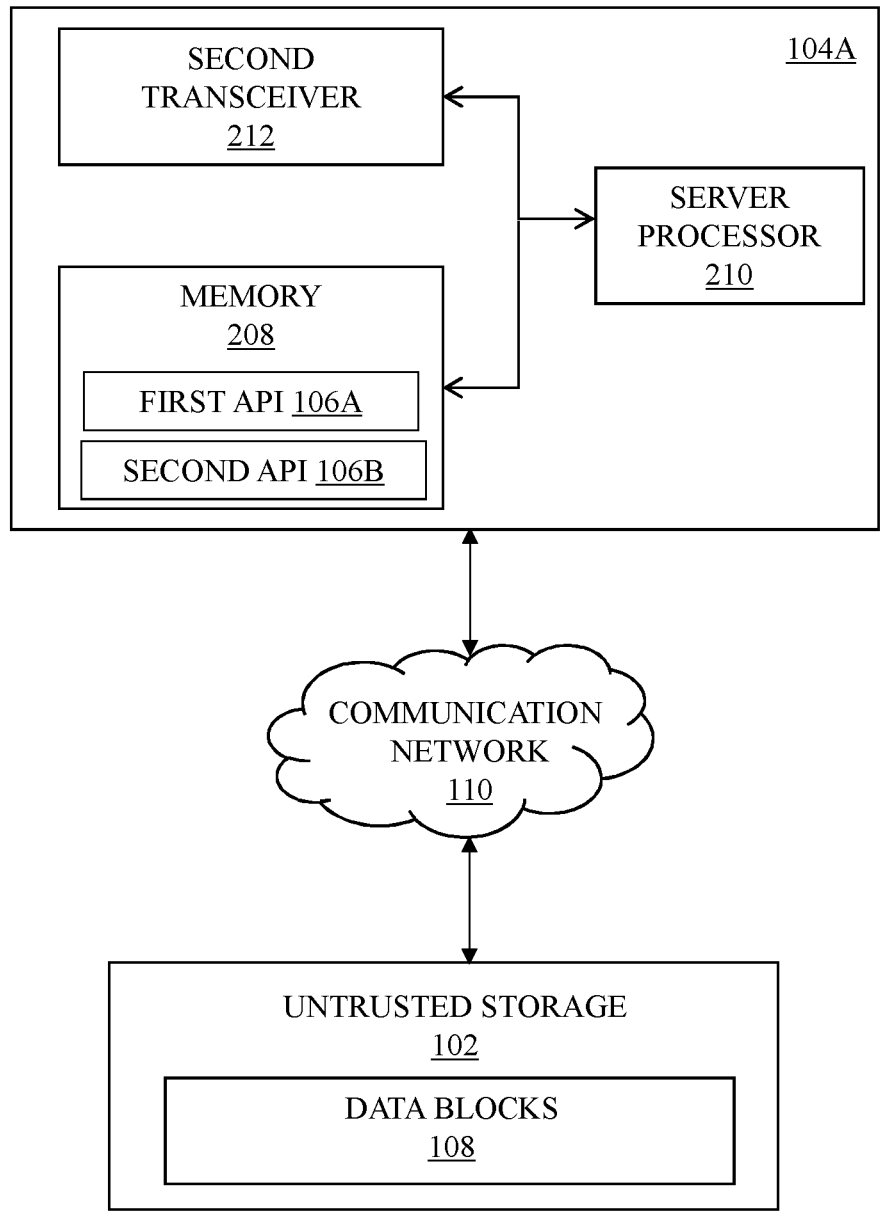
FIG. 2B is a block diagram that illustrates various exemplary components of a trusted server, in accordance with an embodiment of the present disclosure.

FIG. 2B is a block diagram that illustrates various exemplary components of a trusted server, in accordance with an embodiment of the present disclosure. With reference to FIG. 2B, there is shown a trusted server 104A of one or more trusted servers 104A-104N. The trusted server 104A further includes a memory 208, a server processor 210 and a second transceiver 212. The server processor 210 may be communicatively coupled to the second transceiver 212 and the memory 208. The trusted server 104A is communicatively coupled to the untrusted storage 102 via the communication network 110.

In another aspect, the present disclosure provides a trusted server 104A for differential deduplication of one or more data blocks 108 in an untrusted storage 102, wherein the trusted server 104A comprises a memory 208 configured to store instructions and a server processor 210 configured to execute the instructions to implement a first application programming interface 106A for executing a write and a read function between the trusted server 104A and the untrusted storage 102; implement a second application programming interface 106B for executing a request and replacing function between the trusted server 104A and the untrusted storage 102; calculate a hash value and one or more similarity hash values for one or more data blocks 108; perform in the untrusted storage 102 differential deduplication of one or more data blocks 108; decrypt encrypted data blocks; and perform the data deduplication and compression to the untrusted storage 102.

The memory 208 refers to a primary storage of the trusted server 104A. Examples of implementation of the memory 208 may include, but are not limited to, Electrically Erasable Programmable Read-Only Memory (EEPROM), Random Access Memory (RAM), Read Only Memory (ROM), Hard Disk Drive (HDD), Flash memory, Solid-State Drive (SSD), or CPU cache memory. The memory 208 may store an operating system or other program products (including one or more operation algorithms) to operate the trusted server 104A.

The server processor 210 is configured to execute instructions stored in the memory 208. In an example, the server processor 210 may be a general-purpose processor. Other examples of the server processor 210 may include, but is not limited to a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or control circuitry. Moreover, the server processor 210 may refer to one or more individual processors, processing devices, a processing unit that is part of a machine, such as the trusted server 104A.

The second transceiver 212 includes suitable logic, circuitry, and interfaces that may be configured to communicate with one or more external devices, such as the untrusted storage 102. Examples of the second transceiver 212 may include, but is not limited to, an antenna, a radio frequency (RF) transceiver, one or more amplifiers, one or more oscillators, a digital signal processor, a coder-decoder (CODEC) chipset, or a subscriber identity module (SIM) card.

In operation, the server processor 210 of the trusted server 104A is configured to calculate a hash value and one or more similarity hash values for one or more data blocks 108. The server processor 210 is configured to perform in the untrusted storage 102 differential deduplication of one or more data blocks 108. The server processor 210 is further configured to decrypt encrypted data blocks, and perform the data deduplication and compression to the untrusted storage 102.

According to an embodiment, the trusted server 104A is configured to perform a first compression and a first encryption of the data blocks; send the compressed and encrypted data blocks to the untrusted storage 102; perform a request for similar data blocks from the untrusted storage 102; receive a vector of similar data blocks from the untrusted storage 102; decompress the received similar data blocks; determine first data blocks of the received similar data blocks to be used as reference data blocks and the second data blocks of the identified similar data blocks to be compressed using the reference data blocks; re-compress the second data blocks by using the reference data blocks and perform a second encryption for the re-encrypting the re-compressed data blocks; and send the re-encrypted second data blocks compressed with the reference data blocks, hash values of the second data blocks, hash values of the reference data blocks, KeyIDs of the encryption keys of the second data blocks and reference data blocks, KeyIDs of the encryption keys of the reference data blocks to the untrusted storage 102. Thus, the trusted server 104A executes differential compression which enables in efficiently utilizing the storage space of the untrusted storage 102.

Figure 3A:
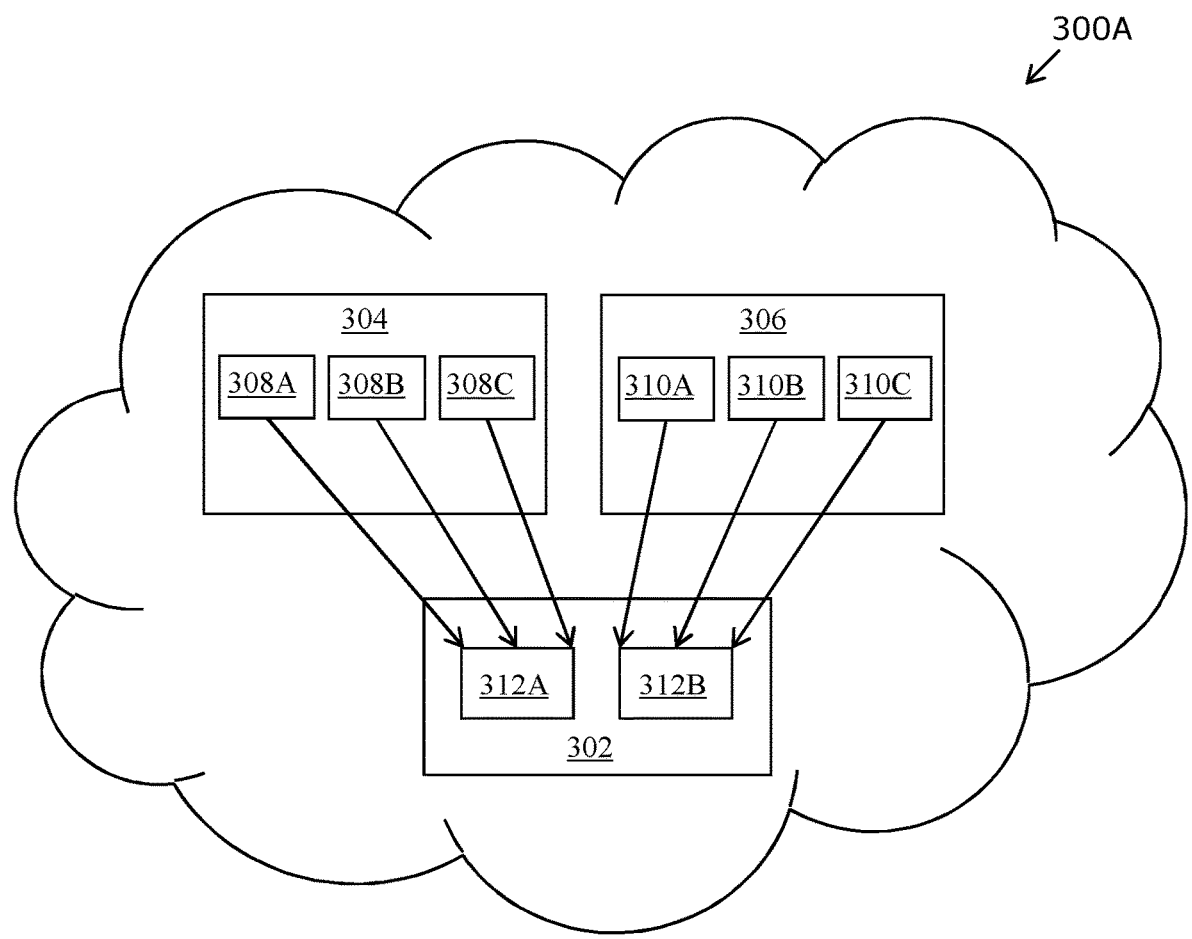
FIG. 3A is an illustration of an exemplary scenario of implementation of a system for differential deduplication of one or more data blocks in an untrusted storage, in accordance with another embodiment of the present disclosure.

FIG. 3A is an illustration of an exemplary scenario of implementation of a system for differential deduplication of one or more data blocks in an untrusted storage, in accordance with another embodiment of the present disclosure. With reference to FIG. 3A, there is shown a system 300A. The system 300A includes an untrusted storage 302, a first set of trusted servers 304, and a second set of trusted servers 306. The first set of trusted servers 304 include trusted servers 308A, 308B, and 308C. The second set of trusted servers 306 include trusted servers 310A, 310B and 310C.

The first set of trusted servers 304 may also be referred to as a first server zone and the second set of trusted servers 306 may also be referred to as a second server zone. Servers of each respective set of trusted servers trust each other and use the same encryption keys and the same hash functions. As a result, servers of each set of trusted servers can have data deduplicated and compressed between its servers.

The untrusted storage 302 includes a first deduplication zone 312A to store data received from the first set of trusted servers 304 and a second deduplication zone 312B to store data received from the second set of trusted servers 306.

The first set of trusted servers 304 and the second set of trusted servers 306 do not trust each other and thus data is not deduplicated and compressed between the first set of trusted servers 304 and the second set of trusted servers 306. The first set of trusted servers 304 and the second set of trusted servers 306 can also not read each other's data because they do not share the encryption keys.

Each of the first set of trusted servers 304 and the second set of trusted servers 306 is configured to execute a first API (not shown) and a second API (not shown) to enable differential deduplication of one or more data blocks 108 in an untrusted storage 302.

Figure 3B:
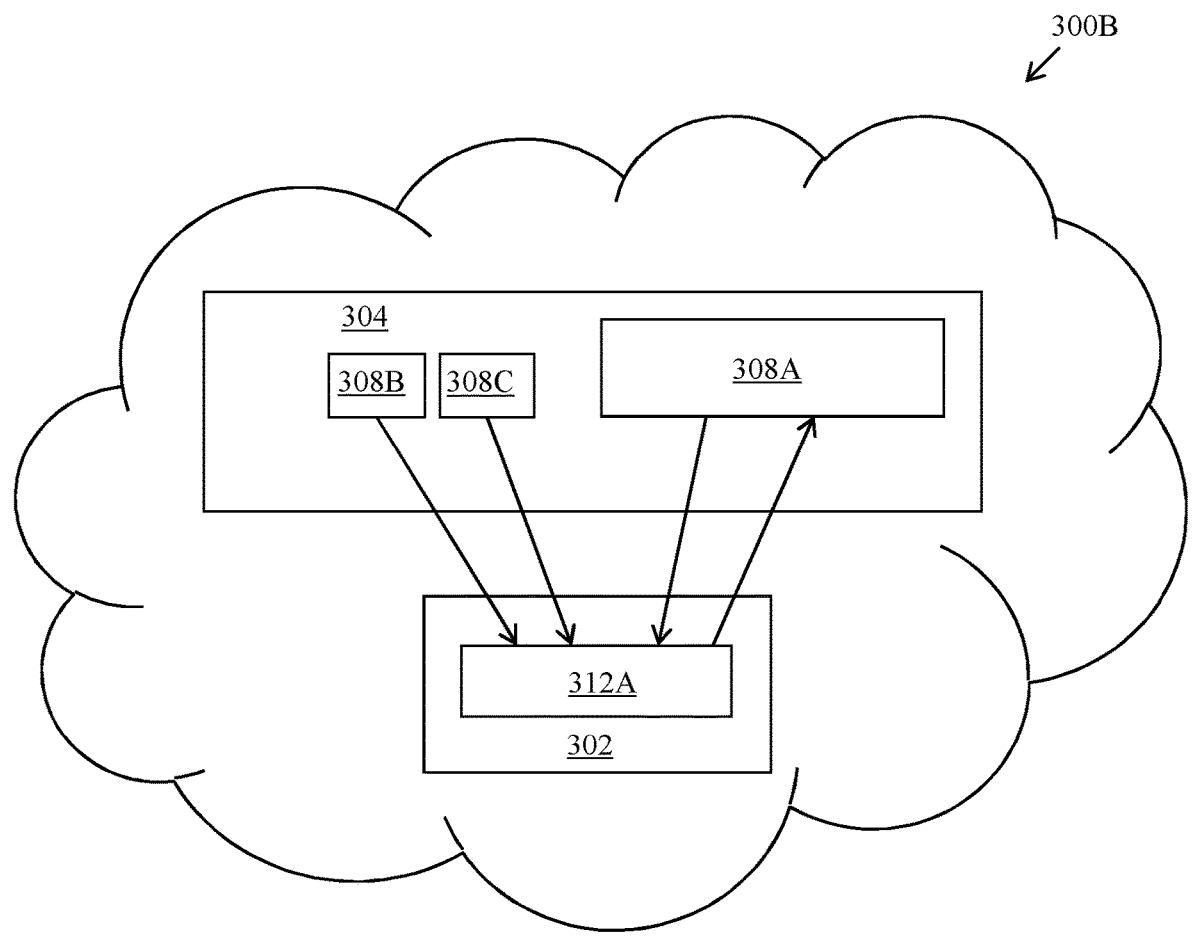
FIG. 3B is an illustration of an exemplary scenario of implementation of a system for differential deduplication of one or more data blocks in an untrusted storage, in accordance with yet another embodiment of the present disclosure.

FIG. 3B is an illustration of an exemplary scenario of implementation of a system for differential deduplication of one or more data blocks in an untrusted storage, in accordance with yet another embodiment of the present disclosure. With reference to FIG. 3B, there is shown a system 300B. The system 300B includes the untrusted storage 302, the first set of trusted servers 304. The first set of trusted servers 304 includes a trusted server for differential compression (e.g. trusted server 308A). The first set of trusted servers 304 include the trusted servers 308A, 308B, and 308C.

The trusted server for differential compression (e.g. trusted server 308A) may be coupled to each of the other trusted servers 308B and 308C. The trusted server for differential compression (e.g. trusted server 308A) is configured to request similar data blocks from the untrusted storage 302. The trusted server for differential compression (e.g. trusted server 308A) is configured to further receive the similar data blocks. The trusted server for differential compression (e.g. trusted server 308A) is further configured to execute differential compression on the similar data blocks and further re-encrypt the data blocks. The trusted server for differential compression (e.g. trusted server 308A) is further configured to write the re-encrypted data blocks compressed with reference data blocks to the untrusted storage 302.

Figure 4:
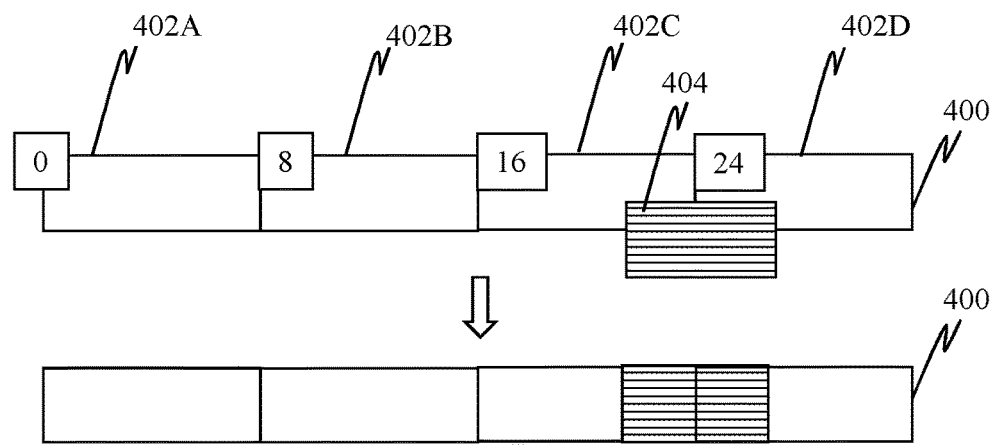
FIG. 4 is an illustration of an untrusted storage used for differential deduplication of one or more data blocks in the untrusted storage, in accordance with another embodiment of the present disclosure.

FIG. 4 is an illustration of an untrusted storage used for differential deduplication of one or more data blocks in the untrusted storage, in accordance with another embodiment of the present disclosure. With reference to FIG. 4, there is shown the untrusted storage 400. The untrusted storage 400 includes blocks 402A, 402B, 402C, 402D to store data.

The size of each block 402A, 402B, 402C, 402D is 8 Kilobytes. The data that is provided as inputs or received as outputs to the untrusted storage 400 is aligned to 8 Kilobytes offset and of size which is a multiple of 8 Kilobytes such as 24 Kilobytes, 40 Kilobytes, 128 Kilobytes and the like. In other words, the size of write must be a multiple of 8 Kilobytes for example writing 8 Kilobytes, 16 Kilobytes, 24 Kilobytes, 64 Kilobytes. When data 404 of size 4 Kilobytes is to be written to offset 18 Kilobytes, then 4 Kilobytes of data is replaced from offset 18 Kilobytes till 22 Kilobytes with the data 404, and then 16 Kilobytes is written to offset 16 Kilobytes.

The sets of trusted servers 104 write the data 404 to the untrusted storage 400 by separating the data 404 into fixed size aligned blocks according to a storage block size for compression. The data 404 is separated at a given trusted server into blocks having fixed aligned size to enable improved storing and efficient retrieval of data from the untrusted storage 400. Beneficially, the separating of the data 404 into blocks also enables improved indexing of the data 404 in the untrusted storage 400.

Figure 5:
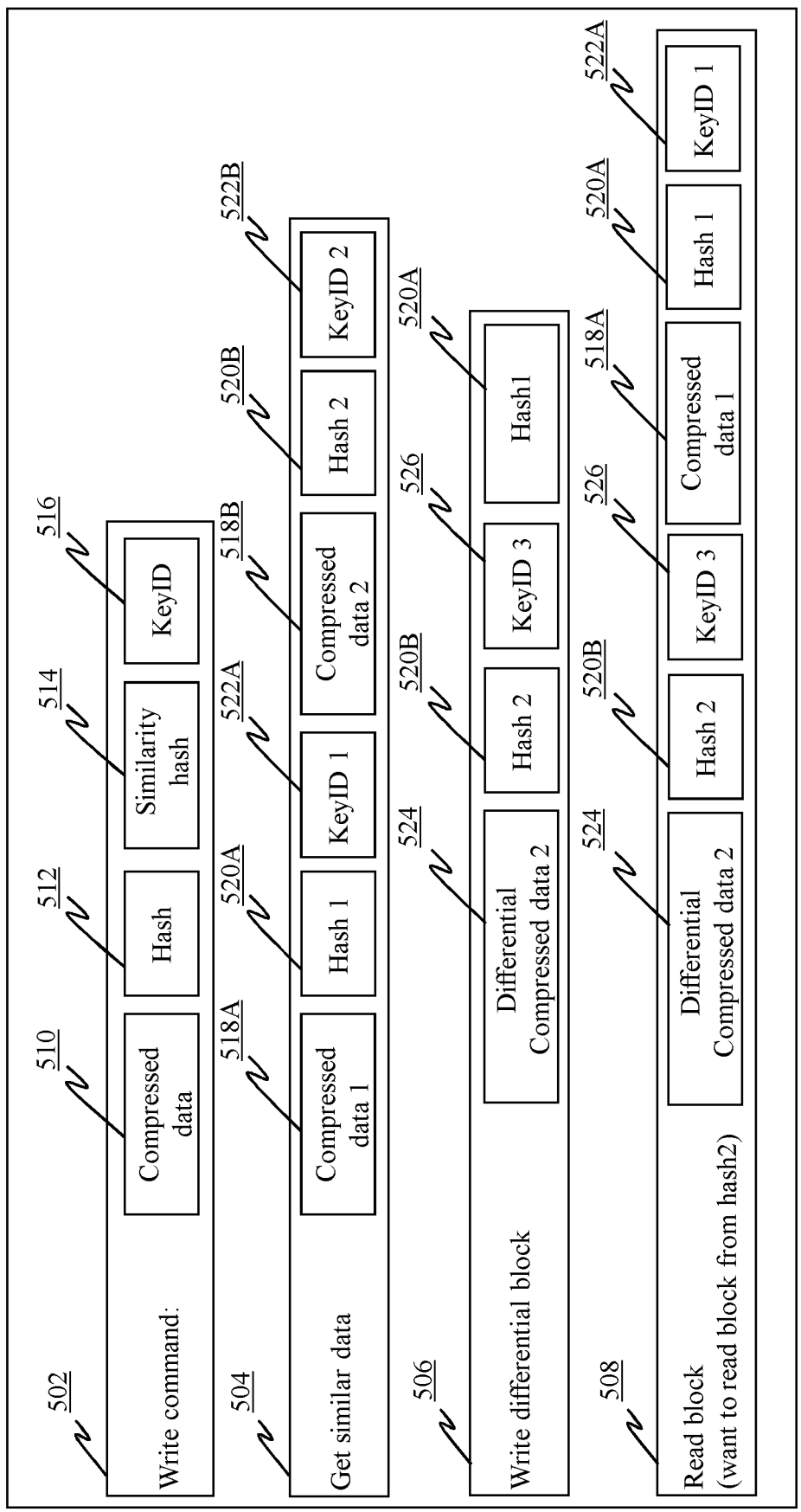
FIG. 5 is an illustration of exemplary commands executed by a trusted server on untrusted storage, in accordance with another embodiment of the present disclosure.

FIG. 5 is an illustration of exemplary commands executed by a trusted server on untrusted storage, in accordance with another embodiment of the present disclosure. With reference to FIG. 5, there is shown a write command 502, a get similar data command 504, a write differential block command 506, a read command 508.

The write command 502 includes compressed data 510, hash value of data before compression 512, similarity hash value of data before compression 514, KeyID 516 of the encryption key used for encryption of data.

The get similar data command 504 includes compressed data 518A (for a first data), hash value of data before compression 520A (for a first data), KeyID 522A of encryption key used for encryption of first data, compressed data 518B (for a second data), hash value of data before compression 520B (for a second data), KeyID 522B of encryption key used for encryption of second data.

The write differential block command 506 includes differentially compressed data 524, KeyID of encryption key 526 used for encrypting differentially compressed data, hash value of data before compression 520B (for a second data), hash value of data before compression 520A (for a first data).

The read command 508 includes differentially compressed data 524, KeyID of encryption key 526 of encryption key used for encrypting differentially compressed data, hash value of data before compression 520B (for a second data), compressed data 518A (for a first data), hash value of data before compression 520A (for a first data), KeyID 522A of encryption key used for encryption of first data.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

The invention claimed is:

1. A method for differential deduplication of one or more data blocks in an untrusted storage, the method comprising:
   providing a hash value of the one or more data blocks, one or more similarity hash values of the one or more data blocks, and an identification (KeyID) of an encryption key of one data block of the one or more data blocks;
   performing, by a trusted server, a first compression and a first encryption of the one or more data blocks;
   sending the compressed and encrypted one or more data blocks from the trusted server to the untrusted storage, by executing a write function of a first application programming interface (API);
   identifying, by the untrusted storage, similar data blocks of the compressed and encrypted one or more data blocks with identical similarity hash values;
   performing, by the trusted server, a request for the similar data blocks from the untrusted storage by executing a second API;
   receiving, by the trusted server, a vector comprising the similar data blocks from the untrusted storage by performing a read function of the second API;
   decrypting and decompressing, by the trusted server, the similar data blocks comprised in the received vector;
   identifying similarities between the decrypted and decompressed similar data blocks;
   determining first data blocks of the decrypted and decompressed similar data blocks as reference data blocks and second data blocks of the decrypted and decompressed similar data blocks to be compressed using the reference data blocks;
   performing, by the trusted server, a second compression by using the reference data blocks and performing a second encryption to re-compress and re-encrypt the second data blocks;

performing a write function, by executing the second API, to the untrusted storage, and sending the re-compressed and re-encrypted second data blocks compressed with the reference data blocks, hash values of the second data blocks, hash values of the reference data blocks, KeyIDs of encryption keys of the second data blocks, KeyIDs of encryption keys of the reference data blocks from the trusted server to the untrusted storage; and replacing in the untrusted storage the compressed and encrypted one or more data blocks with the re-compressed and re-encrypted second data blocks and obtaining differential deduplication data blocks.

2. The method according to claim 1, wherein the trusted server belongs to one or more sets of trusted servers.

3. The method according to claim 1, wherein the method further comprises decompressing the differential deduplication data blocks by performing a decryption of the differential deduplication data blocks, performing a decryption of the compressed reference data blocks, performing a decompression of the decrypted reference data blocks, performing a decompression of the differential deduplication data blocks by using decompressed reference data blocks.

4. The method according to claim 1, wherein the sending the compressed and encrypted one or more data blocks comprises sending a size of the one or more data blocks, the hash value of the one or more data blocks, the one or more similarity hash values of the one or more data blocks, and the KeyID of the encryption key of the one block of the one or more data blocks.

5. The method according to claim 1, wherein the receiving the vector comprises receiving a size of the compressed and encrypted one or more data blocks, the KeyID of the encryption key of the one block of the one or more data blocks, the hash value of the one or more data blocks, and the one or more similarity hash values of the one or more data blocks.

6. The method according to claim 1, wherein the vector comprises the similar data blocks with largest common similarity hash values.

7. A trusted server for differential deduplication of one or more data blocks in an untrusted storage, wherein:
the trusted server comprises an interface; at least one memory; and at least one processor coupled to the interface and the at least one memory, wherein the at least one memory stores programming instructions for execution by the at least one processor to cause the trusted server to perform operations comprising:
implementing a first application programming interface for executing at least one of a write function and a read function between the trusted server and the untrusted storage;
implementing a second application programming interface for executing at least one of a request function and a replacing function between the trusted server and the untrusted storage;
calculating a hash value and one or more similarity hash values for the one or more data blocks;
performing in the untrusted storage differential deduplication of the one or more data blocks;
decrypting encrypted data blocks; and
performing a data deduplication and compression to the untrusted storage.

8. The trusted server according to claim 7, wherein the operations further comprise:
performing a first compression and a first encryption of the one or more data blocks;

sending the compressed and encrypted one or more data blocks to the untrusted storage;
performing a request for similar data blocks from the untrusted storage;
receiving a vector comprising the similar data blocks from the untrusted storage;
decrypting and decompressing the similar data blocks comprised in the received vector;
determining first data blocks of the decrypted and decompressed similar data blocks as reference data blocks and second data blocks of the decrypted and decompressed similar data blocks to be compressed using the reference data blocks;
re-compressing and re-encrypting the second data blocks by performing a second compression using the reference data blocks and performing a second encryption; and
sending the re-compressed and re-encrypted second data blocks compressed with the reference data blocks, hash values of the second data blocks, hash values of the reference data blocks, identifications (KeyIDs) of encryption keys of the second data blocks, and KeyIDs of encryption keys of the reference data blocks to the untrusted storage.

9. A system for differential deduplication of one or more data blocks in an untrusted storage, the system comprises:
the untrusted storage;
one or more sets of trusted servers comprising one or more trusted servers;
a first application programming interface for executing at least one of a write function and a read function between the one or more trusted servers and the untrusted storage;
a second application programming interface for executing at least one of a request function and a replacing function between the one or more trusted servers and the untrusted storage;
at least one processor; and
at least one memory coupled to the at least one processor and storing programming instructions for execution by the at least one processor to cause the system to perform operations comprising:
receiving, by the untrusted storage, compressed and encrypted one or more data blocks;
identifying, by the untrusted storage, similar data blocks of the compressed and encrypted data blocks;
decrypting, by the untrusted storage, compressed reference data blocks;
calculating, by the one or more trusted servers, a hash value, and one or more similarity hash values for the one or more data blocks;
performing, by the one or more trusted servers, in the untrusted storage differential deduplication of the one or more data blocks;
decrypting, by the one or more trusted servers, encrypted data blocks; and
performing, by the one or more trusted servers, a data deduplication and compression to the untrusted storage.

10. The system according to claim 9, wherein the system further comprises a key manager running in the at least one processor, and wherein the operations further comprise generating, by the key manager, to the one or more trusted servers one or more encryption keys.

11. The system according to claim 10, wherein the operations further comprise sharing, by each of the one or more sets of trusted servers, the one or more encryption keys, the hash values, and the one or more similarity hash values between trusted servers within the same set.

12. The method according to claim 2, wherein each of the one or more sets of trusted servers shares the hash value of the one or more data blocks, the one or more similarity hash values of the one or more data blocks, and the at least one encryption key of the one or more data blocks between one or more trusted servers within the same set.

13. The trusted server according to claim 7, wherein the trusted server belongs to one or more sets of trusted servers, and wherein each of the one or more sets of trusted servers shares the hash value of the one or more data blocks and the one or more similarity hash values of the one or more data blocks between one or more trusted servers within the same set.

14. The trusted server according to claim 8, wherein the sending the compressed and encrypted one or more data blocks to the untrusted storage comprises sending a size of the one or more data blocks, the hash value of the one or more data blocks, and the one or more similarity hash values of the one or more data blocks to the untrusted storage.

15. The trusted server according to claim 8, wherein the receiving the vector comprises receiving a size of the compressed and encrypted one or more data blocks, the hash value of the one or more data blocks, and the one or more similarity hash values of the one or more data blocks.

16. The trusted server according to claim 15, wherein the vector comprises the similar data blocks with largest common similarity hash values.

17. The system according to claim 9, wherein the operations further comprise obtaining differential deduplication data blocks, performing a decryption of the differential deduplication data blocks, performing a decryption of the compressed reference data blocks, performing a decompression of the decrypted reference data blocks, and performing a decompression of the differential deduplication data blocks by using the decompressed reference data blocks.

18. The system according to claim 9, wherein the operations further comprise:

performing, by the one or more trusted servers, a first compression and a first encryption of the one or more data blocks to obtain the compressed and encrypted one or more data blocks.

19. The system according to claim 9, wherein the receiving the compressed and encrypted one or more data blocks comprises receiving a size of the one or more data blocks, the hash value of the one or more data blocks, and the one or more similarity hash values of the one or more data blocks.

20. The system according to claim 9, wherein the operations further comprise:

receiving, by the one or more trusted servers, a vector comprising the similar data blocks from the untrusted storage.

* * * * *